(12) United States Patent
Haug

(10) Patent No.: US 8,103,971 B2
(45) Date of Patent: Jan. 24, 2012

(54) SYSTEM AND METHOD FOR NOTIFYING ACTIONS

(75) Inventor: Tobias Haug, Heidelberg (DE)

(73) Assignee: SAP AG, Walldorf (DE)

( * ) Notice: Subject to any disclaimer, the term of this patent is extended or adjusted under 35 U.S.C. 154(b) by 476 days.

(21) Appl. No.: 11/617,723

(22) Filed: Dec. 29, 2006

(65) Prior Publication Data

US 2008/0163120 A1    Jul. 3, 2008

(51) Int. Cl.
*G06F 3/048* (2006.01)

(52) U.S. Cl. ........................................................ 715/843

(58) Field of Classification Search .................... 715/843
See application file for complete search history.

(56) References Cited

U.S. PATENT DOCUMENTS

| | | | |
|---|---|---|---|
| 6,934,912 B2* | 8/2005 | Simpson et al. | 715/745 |
| 7,062,497 B2* | 6/2006 | Hamburg et al. | 1/1 |
| 7,496,830 B2* | 2/2009 | Rubin et al. | 715/206 |
| 2001/0049704 A1* | 12/2001 | Hamburg et al. | 707/530 |
| 2002/0180785 A1* | 12/2002 | Simpson et al. | 345/745 |
| 2003/0079180 A1* | 4/2003 | Cope | 715/511 |
| 2004/0233235 A1* | 11/2004 | Rubin et al. | 345/738 |
| 2006/0074929 A1* | 4/2006 | Weber et al. | 707/100 |

* cited by examiner

*Primary Examiner* — William Bashore
*Assistant Examiner* — Henry Orr

(57) ABSTRACT

What is described is a method and system for notifying actions. The method includes a method comprising performing an action, storing an action detail in a memory, retrieving the action detail from the memory in an expandable action menu, and displaying the action detail in the expandable action menu.

12 Claims, 7 Drawing Sheets

SYSTEM AND METHOD FOR NOTIFYING ACTIONS

FIELD OF THE INVENTION

The invention relates to an action notification. More particularly, the invention relates to a system and method to notifying a user of an action.

DESCRIPTION OF THE RELATED ART

Computer users often perform various actions while working in a software application. For example, the user may make changes in entry fields, give print commands, and send data to a destination from the software application. The software application may include many sub-applications having different user interfaces included in the software application. The user performs various actions in the software applications, and in the sub-applications through respective user interfaces.

In a session, it may become difficult for the user to remember all such actions. It is also difficult for the user to remember the sub-application where the action was performed. This problem is prominent when the user is working for long hours in the software application or takes a break while working.

This may create additional problem if the user wants to review the actions. The user will have to check entry in each input field and selection that was made for each selection menu. In addition, the user may have limited information about actions that is not displayed, for example print commands or data sent to a destination. This may result in an inefficient process and painful user experience.

During a review process, accessing a large number of user interfaces and navigation links are unnecessarily confusing. In addition, it may be difficult to navigate, especially on devices with limited display area.

Typically, cellular phones and personal digital assistants operate with limited bandwidth and therefore require significant time to download user interfaces. Consequently, when the user frequently traverses the user interfaces to review in sub-applications, the process of repeatedly downloading each user interface and locating the action becomes tedious.

There is no convenient mechanism for automatically notifying actions performed in the software application. Accordingly, improvements in notifications of actions in the software application are desired to address the problems.

SUMMARY OF THE INVENTION

What is described is a method and system for notifying actions. The method includes a method comprising performing an action, storing an action detail in a memory, retrieving the action detail from the memory in an expandable action menu, and displaying the action detail in the expandable action menu.

BRIEF DESCRIPTION OF THE DRAWINGS

The embodiments of the invention, together with its advantages, may be best understood from the following detailed description taken in conjunction with the accompanying figures in which.

DETAILED DESCRIPTION

Figure 1:
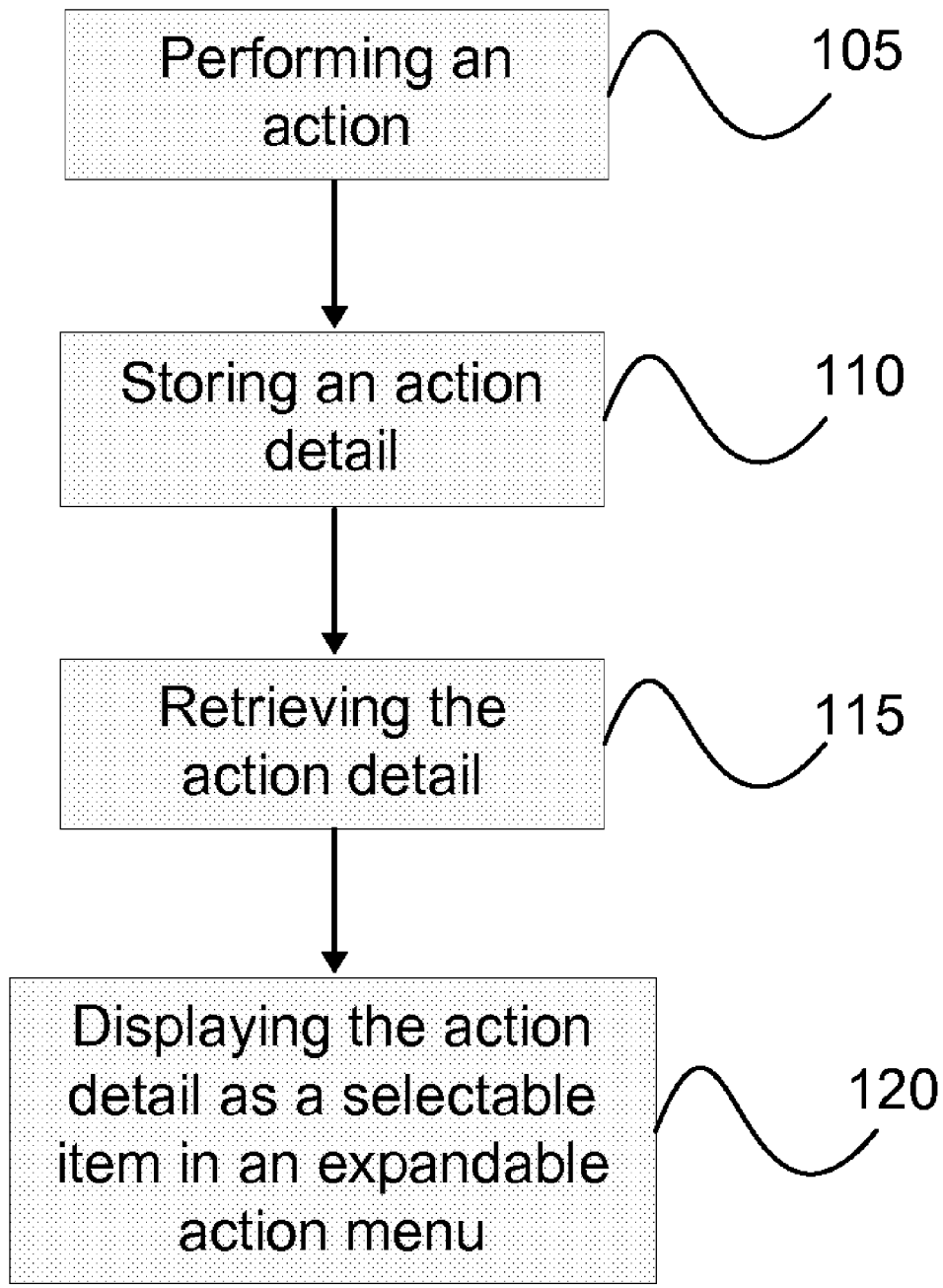
FIG. 1 illustrates a method for notifying action according to an embodiment of the invention.

Embodiments of the invention are generally directed to a method and a system for notifying actions. An embodiment of the invention describing the method is shown in FIG. 1. The method includes performing an action at 105 through a user interface. At 110, an action detail defining the action is stored in a memory. At 115, the action detail is retrieved in an expandable action menu from the memory, and at 120 the action detail is displayed in the expandable action menu.

The action includes actions that are performed by a user in a software application. The software application may include many sub-applications under various navigation levels and in different user interfaces. The action includes changing an entry field, giving print commands, sending data to a destination, saving changes, creating new objects, and selecting an option. Those of skill in the art will recognize that many other extendible actions and sub-applications depending upon the software application are possible and fully within the scope and spirit of this disclosure.

The user may use a selection agent to perform an action on a user interface. The selection agent includes at least one of a variety of pointing devices and techniques such as pressing of a button on a mouse, pressing a button on a stylus, pressing a key on a keyboard or speaking a voice command.

Action detail defines the action performed by the user. The action detail may include an attribute of the action. For example, attributes for a print command may include software page reference which is printed, and number of pages printed. Similarly, attributes relating to change in an entry may include sub-application reference, heading reference where entry has changed and changed value. Likewise, attributes for sending data to a destination may include destination entry, file transferred, and size of the file. Those skilled in the art will appreciate that many different ways of defining the action are possible and the action detail may also depend upon size of the display device.

The memory includes a local cache, random access memory available with a user device. The memory may also include a persistent storage for storing the action detail. In addition, the memory may also include database or other data storing medium. Such databases or storing medium are based on different data models such as flat model, hierarchical model, network model, relational model, dimensional model, and object database model.

Figure 2:
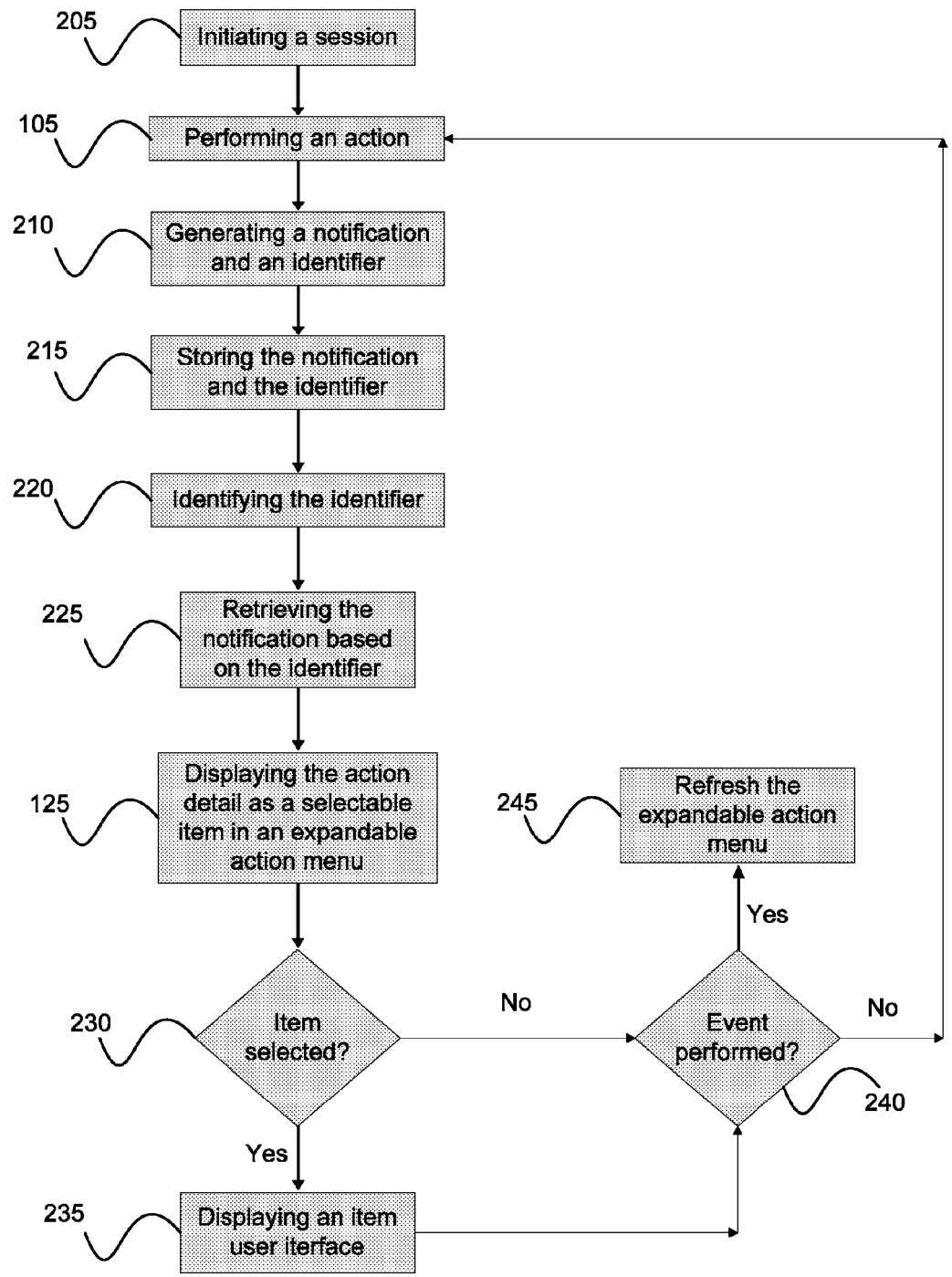
FIG. 2 illustrates a method for notifying action according to another embodiment of the invention.

FIG. 2 illustrates additional details of one embodiment of the invention. At 205, a session of a software application is initiated and an action is performed at 105. The session is initiated when the user starts accessing the software application and ends when the user quits the software application.

Storing the action detail may include generating a notification at 210, wherein the notification includes an attribute of the action. This further includes generating an identifier at 210 to associate the notification with an event. The notification and the identifier is then sent to the memory and stored therein at 215. Retrieving the action detail in the expandable action menu includes identifying the identifier associated with an event at 220 and retrieving the notification in the expandable action menu of the identified event at 225.

At 230, a determination is made if an item representing an action detail in the expandable action menu is selected. If so, then at 235 an item user interface is displayed. Further at 240, a determination is made if an event is performed. If so, then at 245, the expandable action menu is refreshed.

The expandable action menu includes but is not limited to a right click, pop-up, drop down and expandable tree. The expandable action menu includes a selectable item representing action detail. The expandable action menu is accessible under an event, which is available on a standard bar. The expandable action menu, the item, the item user interface and the event are described in greater detail below.

A graphical user interface (GUI) employed in one embodiment of the invention is illustrated in FIG. 3 through FIG. 8.

Figure 3:
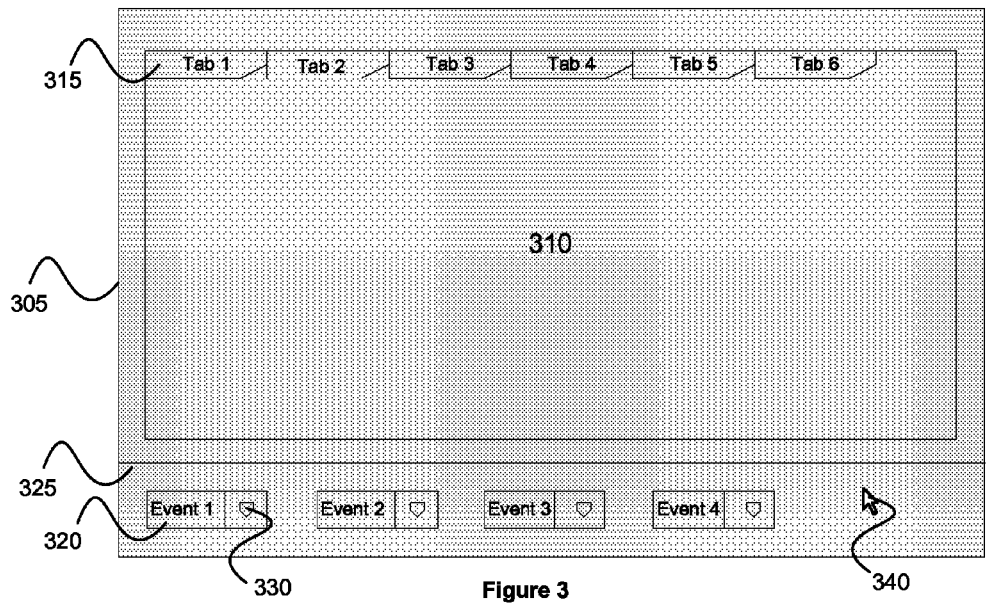
FIG. 3 illustrates a user interface according to an embodiment of the invention.

FIG. 3 illustrates a user interface 305 according to an embodiment of the invention. The user interface represents a software application where the user interface includes an active area 310 to receive an action. The user interface includes sub-applications having different sub-application user interfaces, which are accessible via different tabs 315. The user may also perform action in the sub-application user interface. In present scenario, the active area 310 represents a sub-application user interface for sub-application that is accessible via tab 2.

The user interface also includes a standard bar 325, which is available to the user in all sub-application user interfaces. The standard bar includes an event 320, and an expandable action menu (refer FIG. 4, 335) associated with the event.

Figure 4:
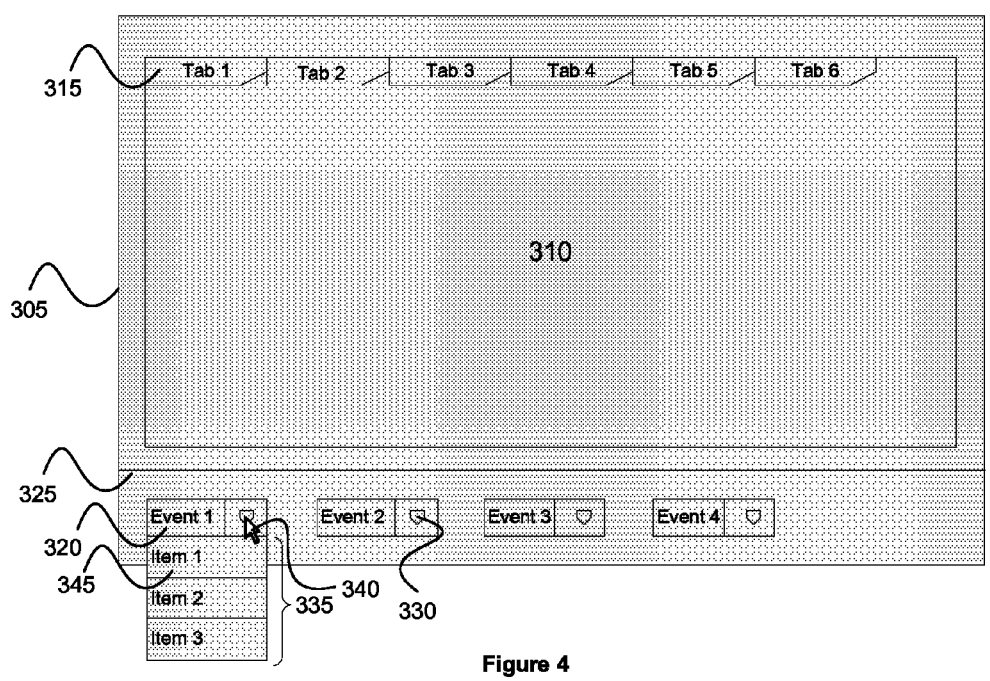
FIG. 4 illustrates an expandable action menu with an item according to an embodiment of the invention.

FIG. 4 illustrates an expandable action menu with item according to an embodiment of the invention. The expandable action menu 335 includes a selectable item 345 representing the action detail. The expandable action menu includes an expansion agent 330 to expand the expandable action menu using a selection agent 340. The expansion of the expandable action menu displays the items listed in the expandable action menu. The selection agent is further used to select the item from the expandable action menu.

Figure 5:
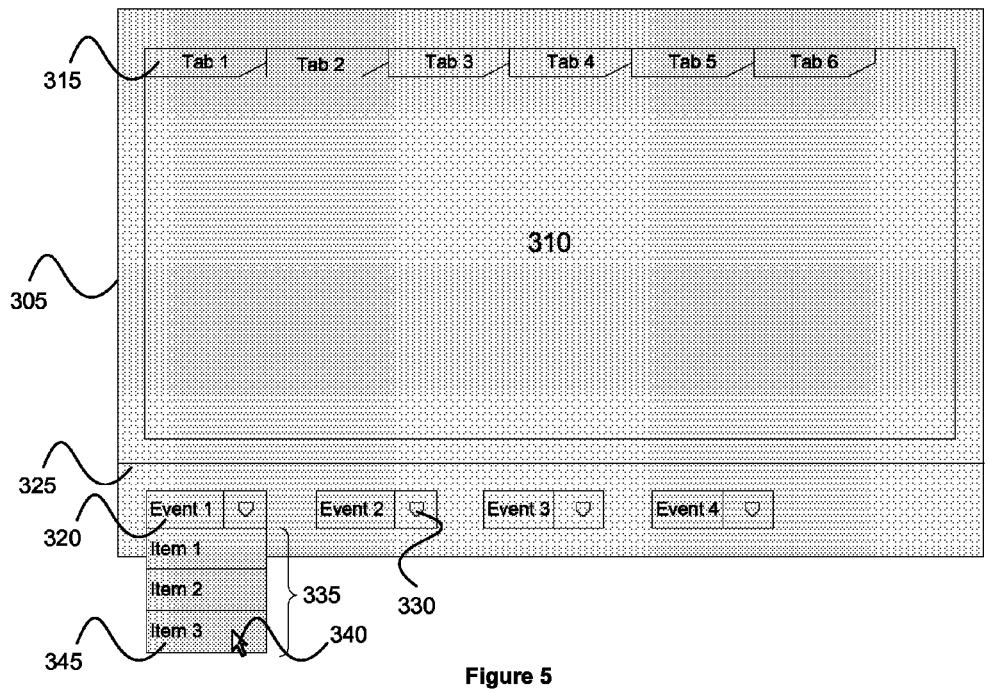
FIG. 5 illustrates selecting an item from the expandable action menu according to an embodiment of the invention.

FIG. 5 illustrates selecting an item from the expandable action menu according to an embodiment of the invention. The selection agent 340 is used to select an item from the expandable action menu. In present scenario, item 3 from the expandable action menu 335 is chosen.

Figure 6:
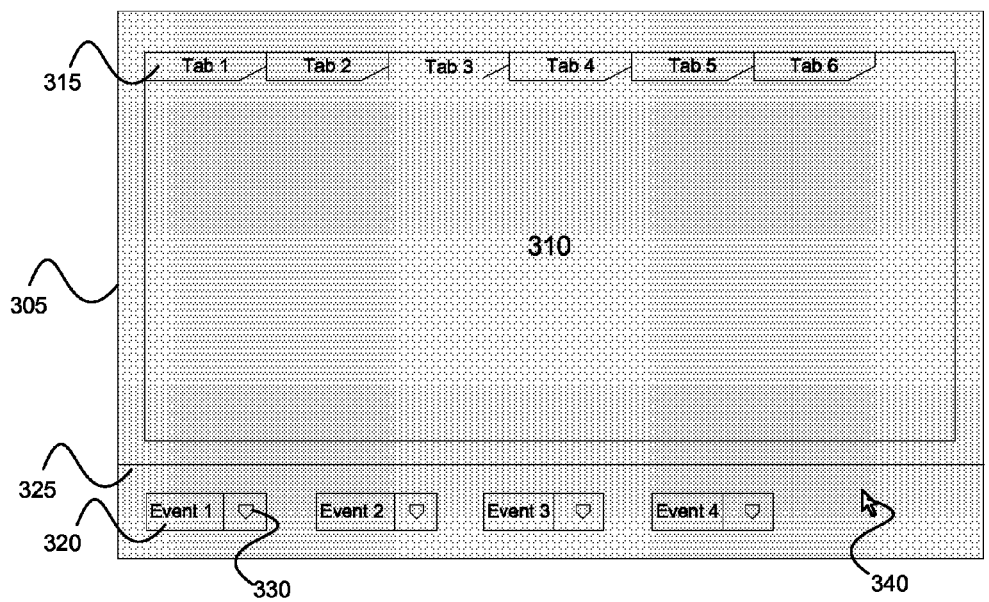
FIG. 6 illustrates an item user interface according to an embodiment of the invention.

FIG. 6 illustrates an item user interface according to an embodiment of the invention. When an item representing an action detail is selected, an item user interface is displayed. The item user interface represents user interface where action corresponding to the selected item was performed. For instance, if action corresponding to item 3 was performed in sub-application user interface of tab 3. So, when item 3 in FIG. 5 is selected, sub-application user interface changes from sub-application user interface of tab 2 to sub-application user interface of tab 3. Therefore, in present scenario, active area 310 represents a sub-application user interface for sub-application that is accessible via tab 3.

Figure 7:
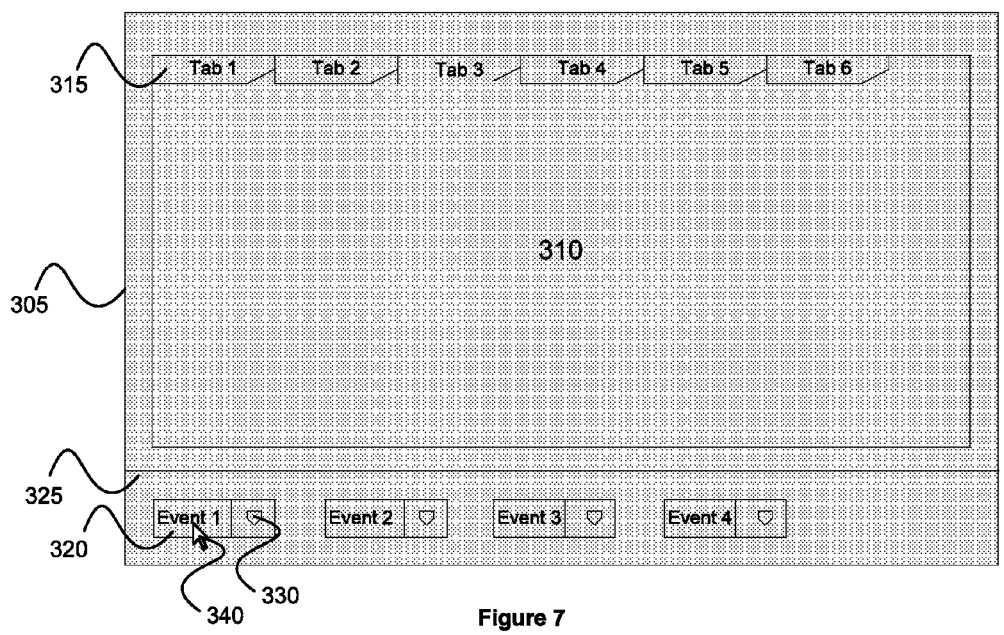
FIG. 7 illustrates performing an event according to an embodiment of the invention.

FIG. 7 illustrates performing an event according to an embodiment of the invention. An event may include task such as save, print, software object actions, and cancel. Those of skill in the art will recognize that many other events are possible and fully within the scope and spirit of this disclosure. In present scenario, an event 1 320 is performed using the selection agent 340.

Figure 8:
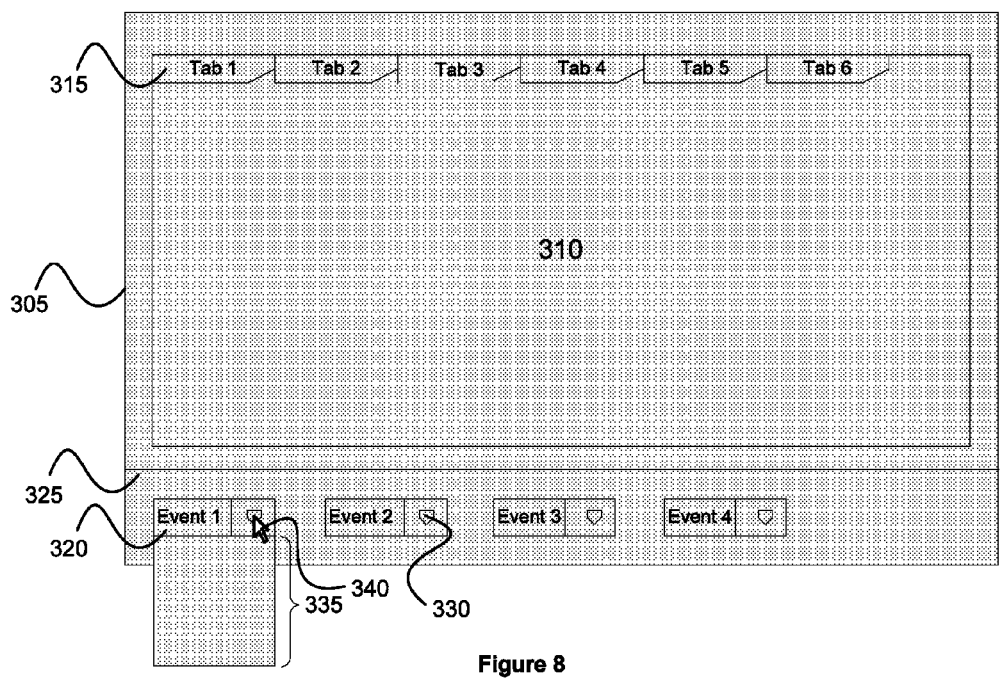
FIG. 8 illustrates a refreshed expandable action menu according an embodiment of the invention.

FIG. 8 illustrates a refreshed expandable action menu according an embodiment of the invention. Once an event is performed, the expandable action menu is refreshed. The refreshing includes clearing entry of the item from the expandable action menu, which is associated with the performed event. As shown, expandable action menu under event 1 is refreshed.

Figure 9:
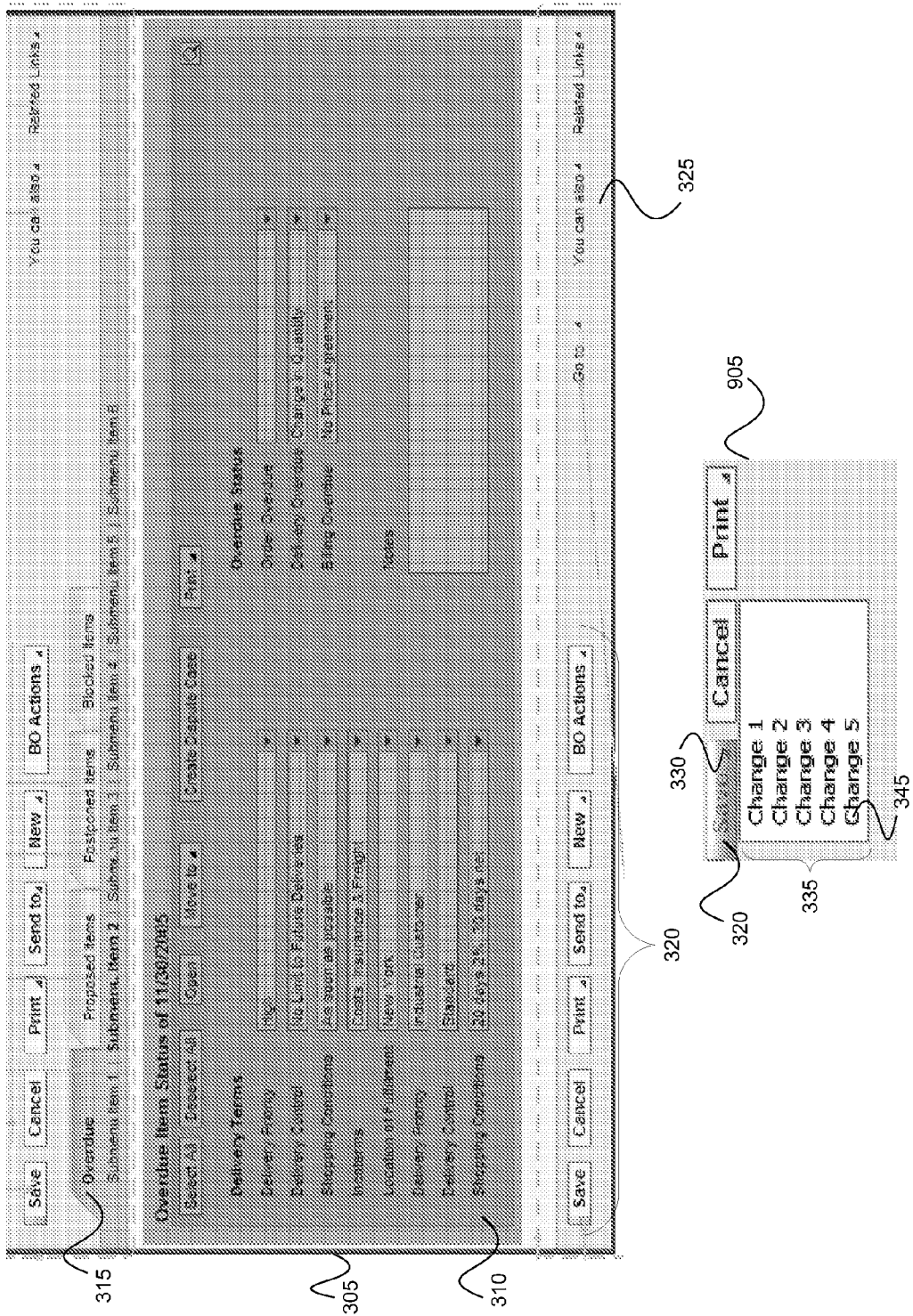
FIG. 9 illustrates a screenshot of a software application according to an embodiment of the invention.

FIG. 9 illustrates a screenshot of a software application according to an embodiment of the invention. 305 represent the user interface of the software application with an active area 310. The action includes various actions that the user may perform in the active area. For example, the user may change entries in entry boxes of delivery terms, and in overdue status, and enter/edit notes. Various sub-applications are represented by sub-application user interfaces, which are accessible via tabs 315 namely overdue, proposed items, postponed items, and blocked items. As shown in overdue tab, each tab may have submenu items. These submenu items are different from the items displayed in the expandable action menu. The user may perform actions in such sub-application user interfaces. A standard bar 325 is represented with an event save 320 available in the standard bar. Now, focusing on an event save in a blown up standard bar section 905 of the user interface; any change made in any of the sub-application user interface is represented by an entry of a change item in the expandable action menu 335. The expandable action menu is accessible through an expansion agent 330.

The user may select one of the change items shown in the expandable action menu. When such selection is made, an item user interface for an action corresponding to the selected change item is displayed. The item user interface shows the user interface where the action was performed. In addition, performing an event, for example, performing save event will refresh the expandable action menu associated with the save event. The refresh includes clearing up entry of change items from the expandable action menu, which is associated with the save event.

Figure 10:
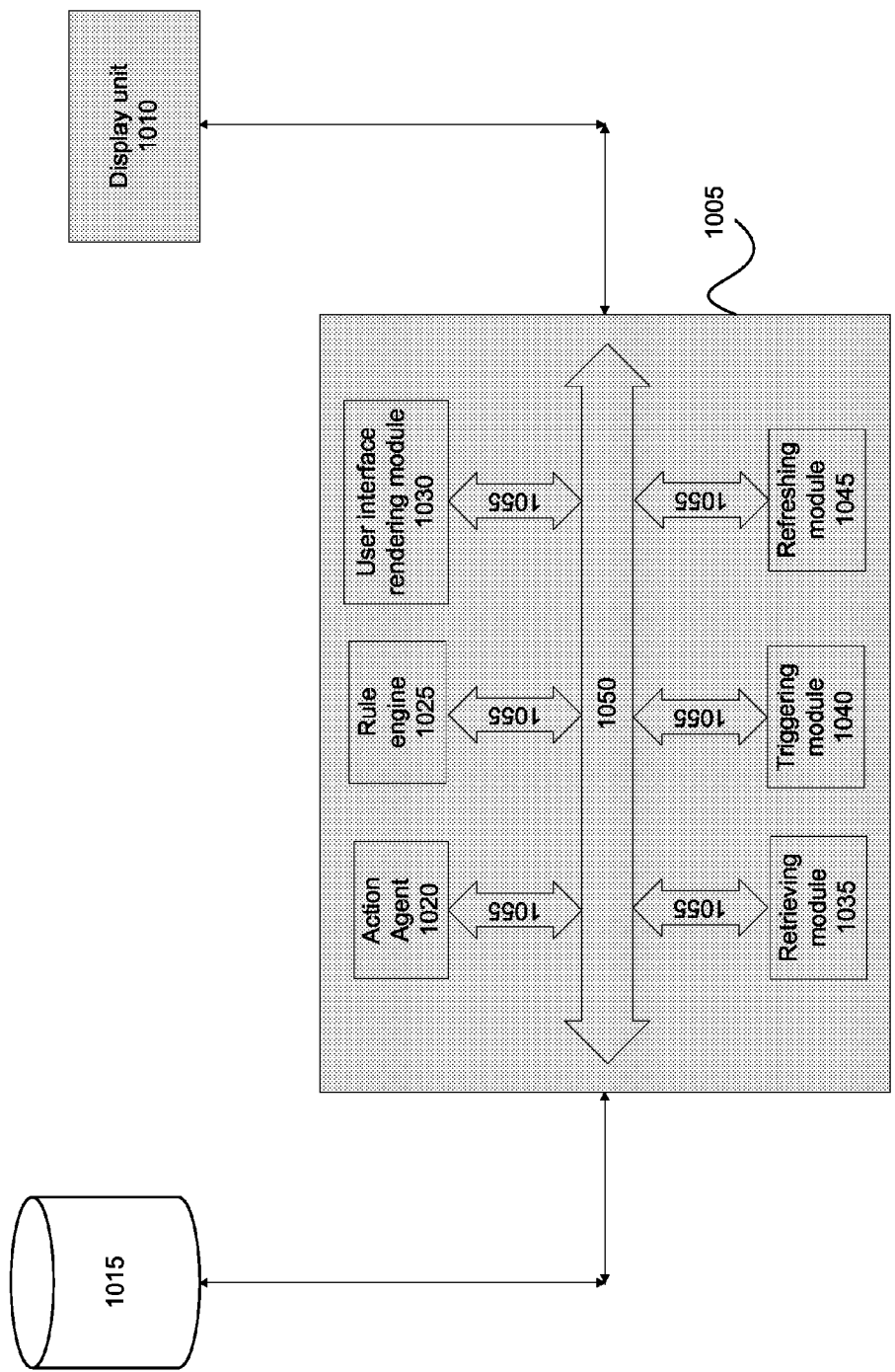
FIG. 10 illustrates a block diagram to notify action according to an embodiment of the invention.

FIG. 10 illustrates a block diagram to notify action according to an embodiment of the invention. The block diagram shows a processing unit 1005 having different components, which are defined below. The processing unit is connected to a display device 1010 to display an action detail in an expandable action menu and a memory 1015 to store an action detail. The processing unit includes an action agent 1020 which controls logic to perform an action in a user interface. The action agent is associated with the selection agent (refer FIG. 3, 340) to enable a user to perform an action.

The processing unit includes a triggering module 1040 to trigger storing when a session is initiated. The triggering module generates a notification that includes an attribute of the action, generates an identifier to associate the notification with an event, and sends the notification and the identifier to the memory 1015. The retrieving module 1035 retrieves the action detail from the memory in the expandable action menu. The retrieving module performs retrieving by identifying the identifier associated with an event and retrieving the notification in the expandable action menu of the identified event.

The processing unit includes a user interface rendering module 1030 to display an item user interface for an action, when item for an action is selected. When an event is performed, a refreshing modules 1045 refreshes the expandable action menu. The processing unit further comprises a rule engine 1025 to set a rule for the items in the expandable action menu. The rule may include rule defining attributes that are to be included in the notification, and arranging rule for the item. Those of skill in the art may include similar rules with respect to the items. The components of the processing unit may communicate among one another via communication channels.

Other embodiments of the invention may be implemented in digital electronic circuitry, or in computer hardware, firmware, software, or in combinations of them.

Elements of the invention may also be provided as a machine-readable medium for storing the machine-executable instructions. The machine-readable medium may include, but is not limited to, Flash memory, optical disks, CD-ROMs, DVD ROMs, RAMs, EPROMs, magnetic or optical cards, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The underlying principles of the invention may be employed using a virtually unlimited number of different types of input data and associated actions.

Accordingly, the scope and spirit of the invention should be judged in terms of the claims which follow.

What is claimed is:

1. A computer implemented method for displaying on a computer user interface, a plurality of action details associated with a user action, for performing an event, the computer implemented method comprising:
   based upon the user action performed in a selected sub application user interface of the computer user interface, identifying the plurality of action details associated with the user action, the computer user interface comprising a standard bar including one or more events yet to be performed with respect to the user action, wherein the standard bar is accessible to the user across a plurality of sub application user interfaces;
   generating a plurality of identifiers to correspondingly associate the plurality of action details with the one or more-events yet to be performed with respect to the user action, wherein the plurality of action details are configured to perform events for at least one selected sub application user interface and at least one unselected sub application user interface;
   upon a user selection of one of the events in the standard bar, retrieving the action details corresponding to the selected event based upon the identifier associated with the selected event; and
   displaying the retrieved action details in an expandable action menu associated with the selected event, for performing the user selected event on the retrieved action details, the retrieved action details rendered as one or more selectable items on the expandable action menu, the one or more selectable items disposed under the selected event in the standard bar.

2. The computer implemented method of claim 1, wherein the user action is selected from a group comprising at least one of entering a record, editing a record, printing, selecting an option, and performing extendible actions in a computer user interface.

3. The computer implemented method of claim 1, further comprising initializing a session to store the plurality of action details in a memory according to the plurality of identifiers associated with the corresponding events.

4. The computer implemented method of claim 1, wherein identifying the plurality of action details associated with the user actions comprises:
   generating a notification associated with the user action; and
   determining an attribute associated with the notification.

5. The computer implemented method of claim 1, wherein receiving the user selection of one of the action details further comprising:
   in response to performing the selected event, refreshing the expandable action menu.

6. The computer implemented method of claim 5, wherein refreshing the expandable menu in response to performing the selected event comprises clearing the one or more retrieved action details from the expandable action menu.

7. The computer implemented method of claim 1, wherein the computer user interface including one or more sub application user interfaces further comprises:
   displaying a first sub application user interface;
   receiving a user selection for the action detail associated with a second sub application user interface; and
   in response to the user selection, displaying the second sub application user interface.

8. An article of manufacture, comprising:
   a machine readable medium storing machine-executable instructions, which when executed by a machine, causes the machine to perform operations comprising:
   based upon the user action performed in a selected sub application user interface of the computer user interface, identifying a plurality of action details associated with the user action, the computer user interface comprising a standard bar including one or more events yet to be performed with respect to the user action, wherein the standard bar is accessible to the user across a plurality of sub application user interfaces;
   generating a plurality of identifiers to correspondingly associate the plurality of action details with the one or more events yet to be performed with respect to the user action, wherein the plurality of action details are configured to perform events for at least one selected sub application user interface and at least one unselected sub application user interface;
   upon a user selection of one of the events in the standard bar, retrieving the action details corresponding to the selected event based upon the identifier associated with the selected event; and
   displaying the retrieved action details in an expandable action menu associated with the selected event, for performing the user selected event on the retrieved action details, the retrieved action details rendered as one or more selectable items on the expandable action menu, the one or more selectable items disposed under the selected event in the standard bar.

9. The medium of claim 8 further comprising instructions for refreshing the expandable action menu when the selected event is performed on the associated action details.

10. A computer system for displaying on a computer user interface, a plurality of action details associated with a user action, for performing an event, the computer system comprising:
- an action agent to identify the plurality of action details associated with the user actions based upon the user action performed in a selected sub application user interface of the computer user interface, the computer user interface comprising a standard bar including one or more events yet to be performed with respect to the user action, wherein the standard bar is accessible to the user across a plurality of sub application user interfaces;
- a triggering module to generate a plurality of identifiers to correspondingly associate the plurality of action details with the one or more events yet to be performed, wherein the plurality of action details are configured to perform events for at least one selected sub application user interface and at least one unselected sub application user interface;
- a memory to store the plurality of action details according to the plurality of identifiers corresponding to the one or more events;
- a retrieving module to retrieve from the memory the action details corresponding to a user selection of one of the events in the standard bar based on the identifier associated with the selected event; and
- a user interface rendering module to display the action details associated with the selected event in an expandable action menu, for performing the user selected event on the retrieved action details, the retrieved action details rendered as one or more selectable items on the expandable action menu, the one or more selectable items disposed under the selected event in the standard bar; and
- a refreshing module to refresh the expandable action menu upon performing the selected event.

11. The computer system of claim 10, wherein the computer user interface comprises an active area to receive the user action.

12. The computer system of claim 10, further comprising:
- a selection agent to select the action details; and
- a user interface rendering module to display an item user interface for the user action when the action details corresponding to the user action are selected.

* * * * *